United States Patent [19]

Loser et al.

[11] Patent Number: 5,361,815

[45] Date of Patent: Nov. 8, 1994

[54] TREAD FOR A TIRE WITH BLOCKS AND RIBS

[75] Inventors: Robert P. Loser; Deborah Ebbott, both of Cuyahoga Falls, Ohio

[73] Assignee: The Goodyear Tire & Rubber Company, Akron, Ohio

[21] Appl. No.: 976,860

[22] Filed: Nov. 16, 1992

[51] Int. Cl.⁵ ............................................. B60C 11/04
[52] U.S. Cl. ................................................ 152/209 R
[58] Field of Search ...................... 152/209 R, 209 D; D12/145-147

[56] References Cited

U.S. PATENT DOCUMENTS

| | | |
|---|---|---|
| D. 115,424 | 6/1939 | Prall . |
| D. 243,756 | 3/1977 | Makino et al. . |
| D. 243,757 | 3/1977 | Hayakawa et al. . |
| D. 250,107 | 10/1978 | Iwata et al. . |
| D. 253,643 | 12/1979 | Makino et al. . |
| D. 275,746 | 10/1984 | Motomura et al. . |
| D. 279,363 | 6/1985 | Fukumoto et al. . |
| D. 287,953 | 1/1987 | Takeuchi . |
| D. 288,081 | 2/1987 | Tsukagoshi et al. ............... D12/147 |
| D. 294,814 | 3/1988 | Nakatani . |
| D. 300,015 | 2/1989 | Cottrell . |
| D. 303,944 | 10/1989 | Himuro et al. ..................... D12/146 |
| D. 328,581 | 8/1992 | Loser . |
| 3,858,633 | 1/1975 | Boileau ........................... 152/209 R |
| 4,807,679 | 2/1989 | Collette et al. .................. 152/209 R |
| 5,160,385 | 11/1992 | Goto et al. ....................... 152/209 R |

FOREIGN PATENT DOCUMENTS

| | | |
|---|---|---|
| 0233135 | 8/1987 | European Pat. Off. . |
| 0348335 | 12/1989 | European Pat. Off. . |
| 0413502 | 2/1991 | European Pat. Off. . |
| 0468815 | 1/1992 | European Pat. Off. . |
| 0477542 | 4/1992 | European Pat. Off. . |
| 0189607 | 9/1985 | Japan .............................. 152/209 R |
| 2133203 | 5/1990 | Japan .............................. 152/209 R |
| 3092402 | 4/1991 | Japan . |
| 2003804 | 3/1979 | United Kingdom . |

OTHER PUBLICATIONS

*Tire Guide*, p. 168, Michelin XDHT Standard & Low Profile.
U.S. Patent Application Ser. No. 07/828,593 filed Jan. 30, 1992, attorney docket number 90316B.

*Primary Examiner*—Michael Ball
*Assistant Examiner*—Nancy T. Krawczyk
*Attorney, Agent, or Firm*—David L. King

[57] ABSTRACT

An elastomeric tread for a pneumatic tire is disclosed. The tread has a pair of ribs, one rib being adjacent each lateral edge of the tread, and a plurality of large block elements located between the ribs. The large block elements are in two rows extending circumferentially about the tread. The ribs and the two rows of blocks are separated by three circumferential zigzag grooves. The blocks are further separated by a plurality of lateral grooves. The lateral grooves extend from one rib to the opposite rib.

9 Claims, 6 Drawing Sheets

TREAD FOR A TIRE WITH BLOCKS AND RIBS

The invention relates to a tread for a pneumatic tire. The tread is particularly well suited for use on a drive axle tire for commercial trucks.

Drive axle tires for trucks are required to provide excellent tractive forces for these heavy vehicles. Block element tread patterns achieve a high level of traction performance. The block elements provide laterally extending surfaces that enable the tire to grip the roadway and exert high contact pressure between the tire and the roadway. The major drawback to the use of block elements in the tread pattern of drive axle tires has been the propensity of such elements to exhibit irregular wear. The occurrence of irregular wear occurs in the blocks as a phenomena known in the art as heel-toe wear, and in the shoulders of such a tire a pattern of high-low wear can be exhibited. Once the onset of irregular wear begins, the tread can rapidly and irregularly wear. The irregularly worn tire transmits serious road vibration through the truck making the tire unsuitable for use. The operator of the vehicle must have the tire removed and have the tread ground to remove the high spots on the tread. By removing tread rubber, it is sometimes feasible to salvage an irregularly worn tire. Naturally, the tread loses many miles of useful life when such a problem occurs.

Ribbed tires have historically achieved superior wear characteristics. Instead of having individual block elements, these ribbed tires have circumferentially continuous ribs of tread rubber. The ribs often have zigzag sides which provide some lateral edges to assist in providing tractive forces. Unfortunately rib tread patterns do not exhibit the traction characteristics achievable by block tires.

Attempts to combine the rib tread and the block element tread have been made. U.S. Pat. No. 4,223,712 describes a pneumatic tire for heavy duty vehicles. The tread has a pair of shoulder ribs and three rows of circumferentially elongated block elements, the block elements being designed to convert to ribs after the tire has worn between 30% and 70% of the tread. Such a design has some of the benefits of block element traction for part of the tread's useful life. After the tread is partially worn, the tire can presumably be removed from the drive axle position and used in a trailer position.

The present invention provides a drive axle truck tire tread which employs a combination of block elements and ribs. A tire tread made according to the present invention can provide uniform wear and excellent traction characteristics over the expected life of the tread.

SUMMARY OF THE INVENTION

An elastomeric tread for a pneumatic tire is disclosed. The tread extends circumferentially about an axis of rotation of the tire. The tread has an inner tread surface, a pair of shoulders, a pair of ribs, a plurality of lateral grooves, three circumferential grooves, and two circumferential rows of block elements. The shoulders define the lateral edges of a ground engageable surface. The axial distance between the lateral edges define the tread width. The ribs extend about the axis of rotation and radially outwardly from the inner tread surface. One rib is adjacent to each lateral edge. Each lateral groove extends generally axially from rib to rib. The three circumferential grooves are of a zigzag configuration. One circumferential groove is centrally located. The second and third circumferential grooves are spaced within 30% of the tread width from a lateral edge. The circumferential and lateral grooves cooperate to define block elements arranged in two circumferential rows. Each block element has first and second sides defined by lateral grooves. The circumferential grooves have an average depth of at least 19 mm and the lateral grooves between the first and second sides of the circumferentially adjacent block elements have an average depth of between 75% and 90% of the average depth of the circumferential grooves.

The block elements each have a surface area which when taken from a footprint of the tire occupies at least 60% of an area defined by a rectangular boundary, preferably at least 65%. The boundary has two axially and two circumferentially extending sides. Each such side intersects an axis or circumferential extremity of the block element thereby enveloping the block element.

The ribs include a circumferentially continuous band or area devoid of lateral grooves. The band having an axial width of at least 10% of the tread width as measured between a pair of planes perpendicular to the axis of rotation of the tread. One of the planes intersects the axially inner ends of any axially innermost lateral edge notches and the other plane intersecting axially outer ends of any axially outermost notch formed by the lateral grooves.

DEFINITIONS

"Axial" and "axially" are used herein to refer to lines or directions that are parallel to the axis of rotation of the tire.

"Circumferential" means lines or directions extending along the perimeter of the surface of the annular tread perpendicular to the axial direction.

"Radial" and "radially" are used to mean directions radially toward or away from the axis of rotation of the tire.

"Lateral" means an axial direction.

"Aspect ratio" of a tire means the ratio of the section height to the section width.

"Footprint" means the contact patch or area of contact of the tire tread with a flat surface at zero speed and under normal load and pressure, including the area occupied by grooves as well as the tread elements.

"Net-to-gross" means the total area of ground contacting tread elements with the footprint divided by the gross area of the footprint.

"Groove" means an elongated void area in a tread that may extend circumferentially or laterally about the tread in a straight, curved, or zigzag manner. Circumferentially and laterally extending grooves sometimes have common portions and may be subclassified as "wide," "intermediate width," "narrow," or "sipe." The sipe typically is formed by steel blades inserted into a cast or machined mold or tread ring therefor. In the appended drawings, sipes are illustrated by single lines because they are so narrow. A "sipe" is a groove having a width in the range from about 0.3% to 0.5% of the tread width, whereas a wide groove has a width (W) greater than 5% of the tread width, an intermediate width groove has a width ½ to less than 5% of the tread width, and a narrow groove has a width of 1/5 to less than ½ W. The "groove width" is equal to tread surface area occupied by a groove or groove portion, the width of which is in question, divided by the length of such groove or groove portion; thus, the groove width is its average width over its length. Grooves, as well as other voids, reduce the stiffness of the tread regions in which they are located. Sipes often are used for this purpose, as are laterally extending narrow or wide grooves. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved and providing stone penetration protection.

"Sipe" means small slots molded into the tread elements of a tire that subdivide the tread surface and improves traction.

"Inside shoulder" as used herein means the shoulder nearest the vehicle.

"Outside shoulder" as used herein means the shoulder farthest away from the vehicle.

"Rib" means a circumferentially extending strip of rubber on the tread which is defined by at least one circumferential groove and either a second such groove or a lateral edge, the strip being laterally undivided by full-depth grooves.

"Tread element" means a rib or a block element.

"Equatorial plane (EP)" means the plane perpendicular to the tire's axis of rotation and passing through the center of its tread.

DETAILED DESCRIPTION OF THE INVENTION

Figure 1:
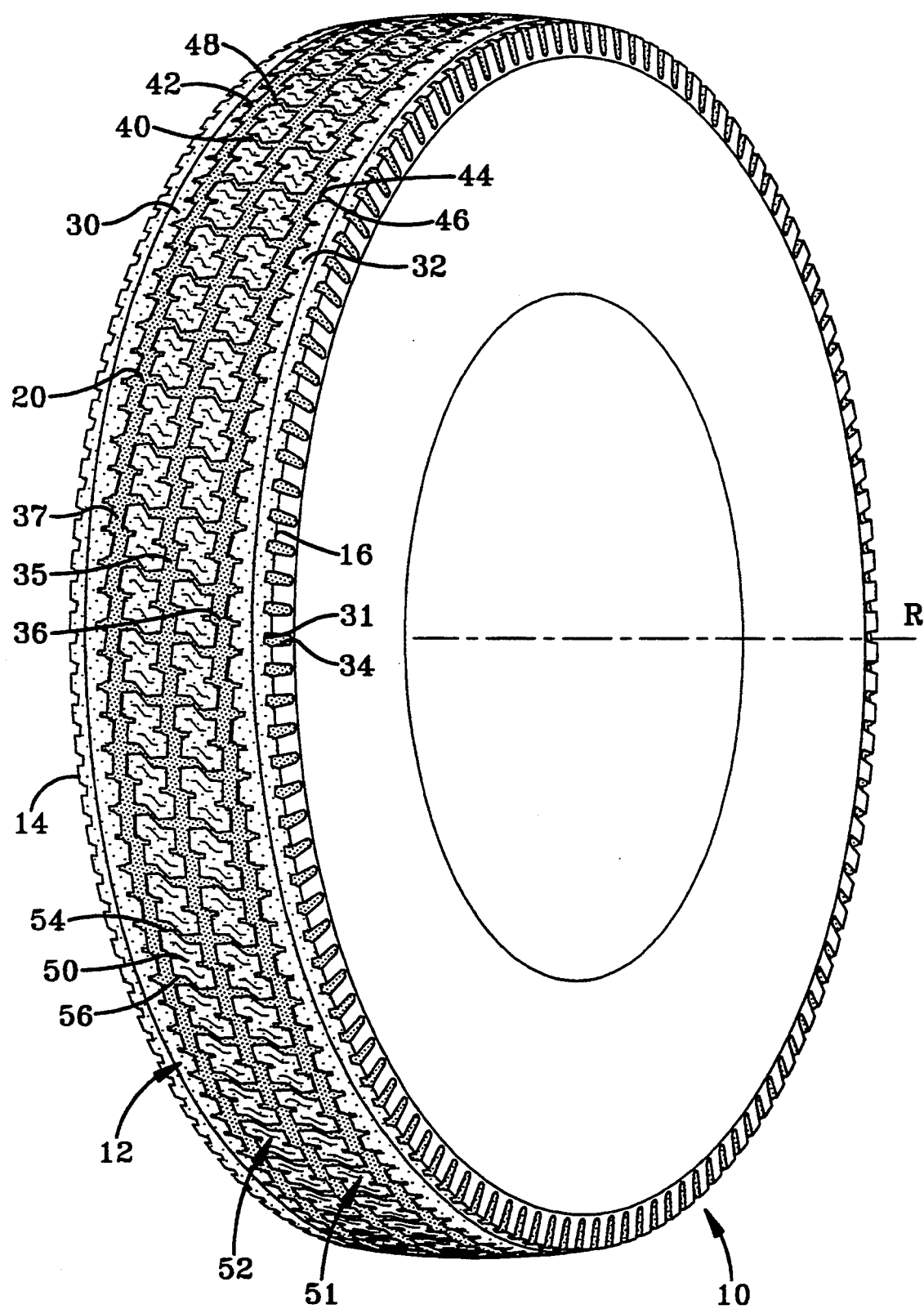
FIG. 1 is a perspective view of a tread according to the present invention annularly attached to a tire.

With reference to FIG. 1, a preferred embodiment of the tread 12 according to the present invention is illustrated. The tread 12 is annularly attached to a tire 10.

The tread, when configured annularly, has an axis of rotation R, a pair of lateral edges 14,16 defined by the shoulders of the tread, and an inner tread surface 20. The distance between the lateral edges is defined as the tread width (TW).

Adjacent each of the lateral edges 14,16 is a rib 30,32. The ribs 30,32 extend circumferentially about the axis of rotation R and radially outwardly from the inner tread surface 20.

The tread has a plurality of lateral extending grooves 40. Each lateral groove 40 extends generally axially from rib 30 to rib 32. The lateral grooves 40 extend into the two shoulder ribs 30,32 forming a notch 42 in each rib. The notch has an axially outer end 46 and a base 44 which is inclined and extends radially above the inner tread surface 20 by at least 10% of the groove depth.

The illustrated tread 12 has three circumferentially extending zigzag grooves 35,36,37. One such groove 35 being centrally located and the second and third such grooves 36,37 being axially spaced within 30% of the tread width (TW) from a lateral edge 14,16. The circumferential and lateral grooves 35,36,37,40 cooperate to define block elements 50. The block elements 50 are arranged in two circumferential rows 51,52. Each block element 50 has a first and second side 54,56 defined by the lateral grooves.

Each shoulder rib 30,32 includes a plurality of axially extending notches 34 which extend from the lateral edge 14,16 to axially inner ends 31.

Figure 3:
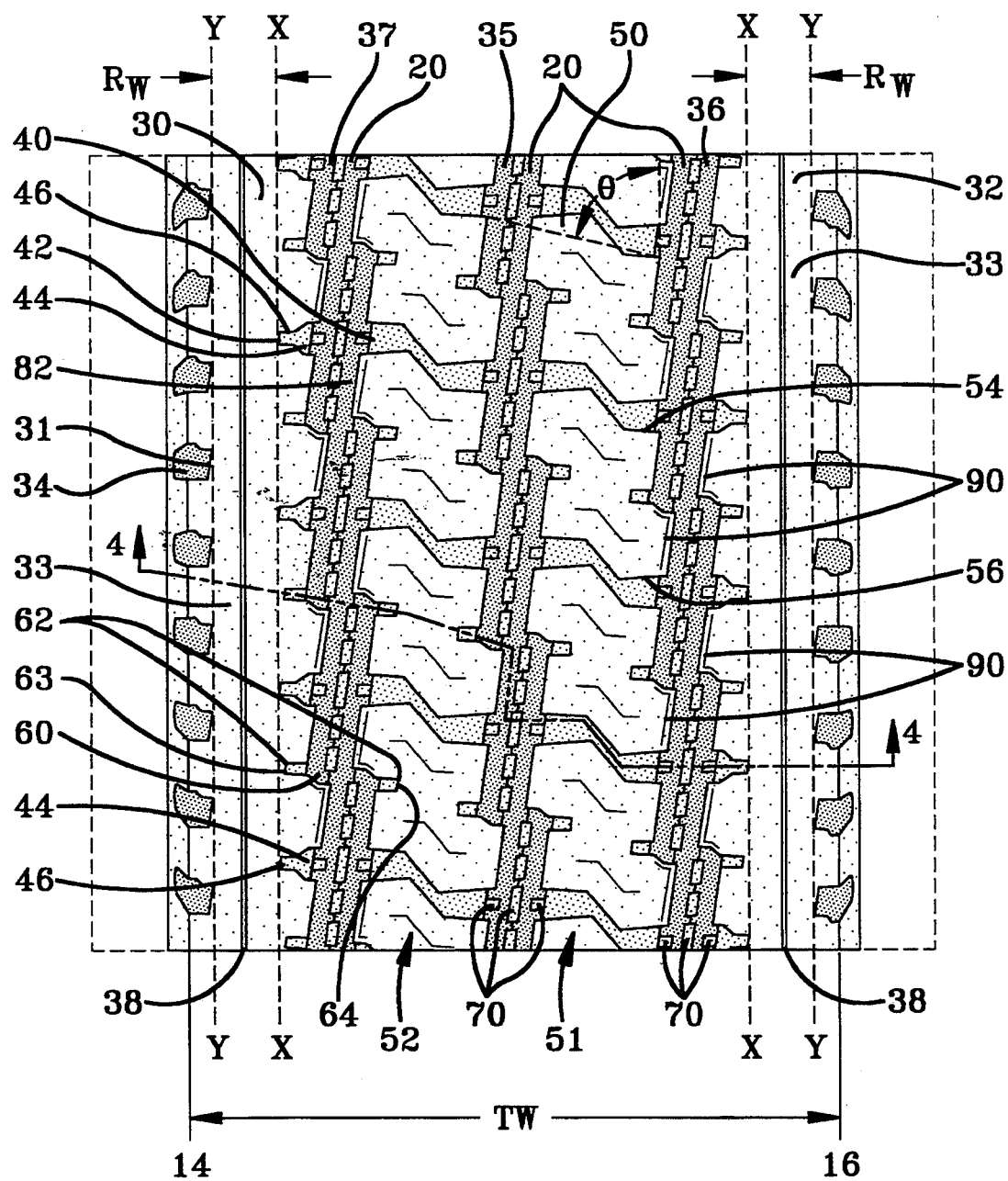
FIG. 3 is a view illustrating the footprint of the tire.

As illustrated in FIG. 3, each of the ribs 30,32 include a circumferentially continuous band 33 devoid of lateral grooves having an axial width RW of at least 10% of the tread width TW as measured between a pair of planes perpendicular to the axis of rotation of the tread 12 with one side plane X-X intersecting axially inner ends of the axial innermost lateral edge notches and the other plane Y-Y intersecting the axially outer ends of the axially outermost notches formed by the lateral grooves 40.

In the illustrated preferred embodiment of FIG. 3, the circumferential zigzag grooves 35,36,37 include a short lateral extending portion 60 about equally spaced between the lateral grooves 40. The short lateral portion 60 extends into the ribs 30,32 or the block elements 50. Each short lateral portion 60 included a notch 62 at the extremities of the groove. Each notch 62 has an axially outermost end 63 and an axially innermost end 64. The axially outermost ends 63 in the illustrated embodiment are axially unaligned. Alternatively, the ends of the notches 62 could be axially aligned. In a tread 12, the circumferentially continuous band 33 would have a width is determined by planes X-X and Y-Y, each plane being perpendicular to the axis of rotation and intersecting the ends of the notches that extend furthest into the rib.

The ribs as described above may further include a narrow circumferentially continuous groove, known in the art as a decoupling groove 38. Such a groove 38 could be placed within the continuous band without adversely affecting wear. Although illustrated, the preferred embodiment does not employ such a decoupling groove.

The shoulder ribs 30,32 as illustrated exhibit excellent wear characteristics. It is believed that the continuous band 33 being of a width of at least 10% of the tread width TW provides a sufficiently stiff shoulder region having a large amount of tread rubber in contact with the roadway such that the occurrence of irregular wear can be minimized. The prior art drive axle tire for trucks either provided block elements in the shoulder or ribs with lateral grooves extending sufficiently into the rib that the rib acted as a block element. The lateral grooves improved the flexibility of the rib while simultaneously weakening the rib such that irregular high-low wear problems were common.

The present invention permits the rib to maintain stiffness and a high contact surface area. Both features are believed to improve the overall tread wear performance.

Figure 5:
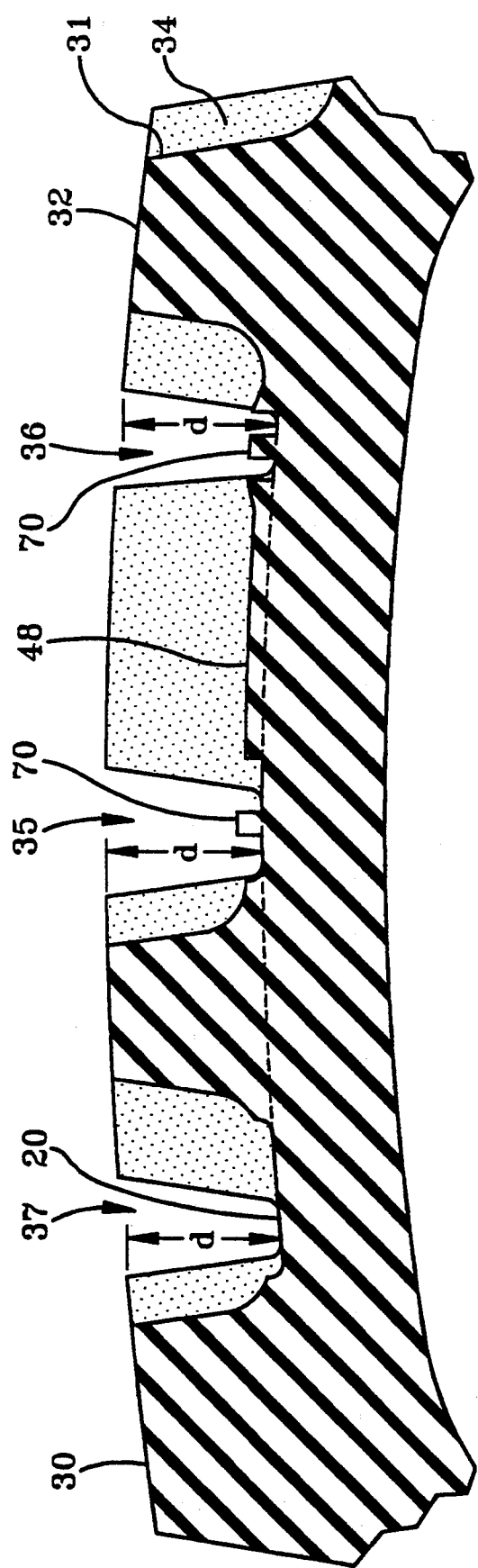
FIG. 5 is an enlarged view of the tread as taken from FIG. 4.

As illustrated in FIG. 5, the circumferential grooves 35,36,37 have a depth (d) of at least 19 mm. The lateral grooves between the first and second sides 54,56 of the circumferentially adjacent block elements 50 has an average depth of between 75% and 90% of the average depth (d) of the circumferential grooves 35,36,37. This reduced depth at the location between the first and second sides creates a tie-bar 48 between the adjacent block elements 50. The height of the tie-bar 48 is kept to a minimum in an attempt to insure that the tread block elements 50 maintain their tractive performance throughout the useful life of the tread. As the tread 12 wears, the shape of the tread pattern is not appreciably altered until the elements are worn to about the level of tie-bar 48.

In the preferred embodiment, the tread grooves 35,36,37 have a depth of at least 22 mm as measured from the inner tread surface radially outwardly.

The combination of stiff shoulder ribs 30,32 and the unique block element shapes with tie bars 48 enables the tread 12 to have these deep grooves. This increased groove depth enables the tread to achieve extremely high tread wear mileage. Typically, drive axle treads have a tread rubber groove depth of less than 26/32 of one inch, or about 20 mm or less. The deepness of the tread grooves makes the block elements 50 more flexible or less stiff. This increased flexibility is a limiting factor in how deep the tread may be because flexible tread elements tend to induce uneven tread wear problems. In the past, an attempt has been made to utilize circumferentially elongated block elements that had leading and trailing edges that were inclined less than 45° relative to the direction of travel. The use of long inclined elements was believed to reduce to uneven tread wear problems. The inclination of the elements relative to the direction of travel also had the resultant effect of a loss of tractive performance. Quite naturally, if the leading and trailing edges of the block elements achieved an orientation perpendicular to the direction of travel, the tractive forces could be improved. Unfortunately, such a design tended to exhibit heel and toe wear and other uneven wear problems. The present design as depicted in the figures has block elements 50 that have leading and trailing first and second sides 54,56 that approach a normal or almost perpendicular orientation relative to the direction of travel. The average inclination $\theta$ of the leading and trailing edges of the tread elements is about between 70° and 85° relative to the direction of travel. This orientation approaches the optimal shape for tractive performance greatly reducing uneven wear problems.

Figure 6:
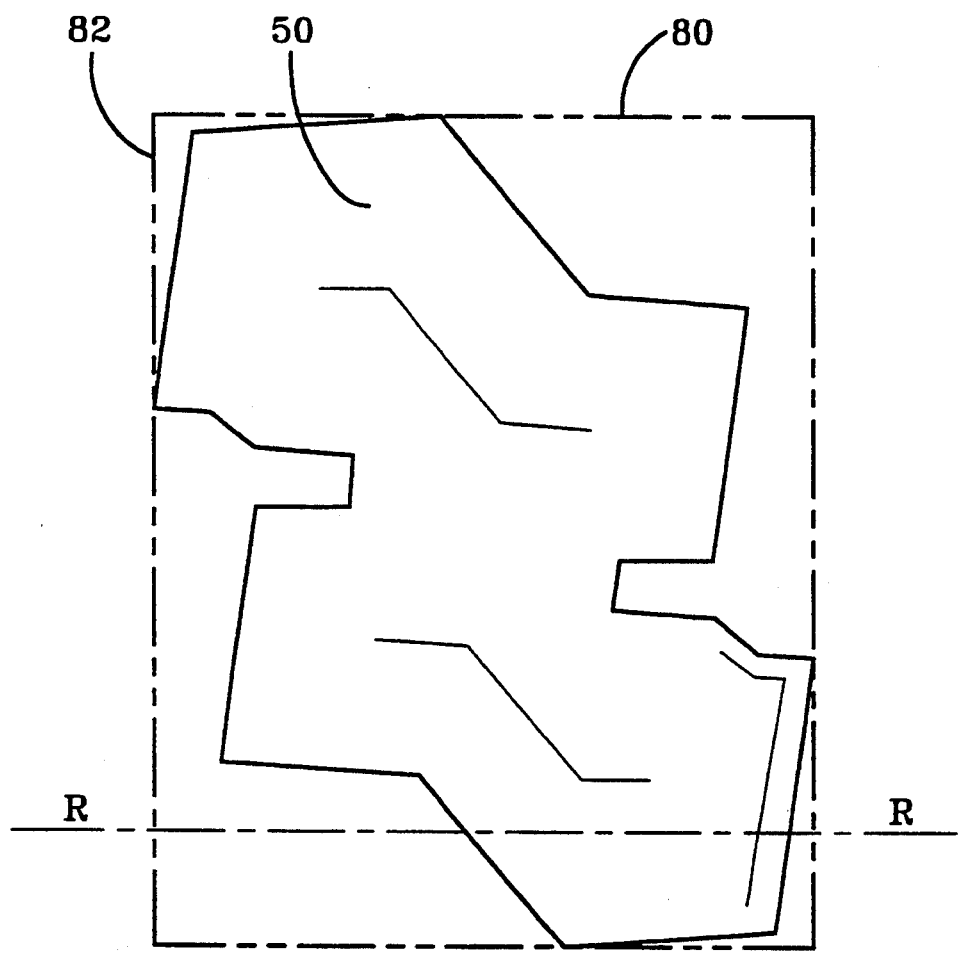
FIG. 6 is an enlarged view of a block element of the tire.

As shown in FIG. 6, the use of only two rows of block elements 51,52 enables the blocks 50 to have an average axial width that is greater than 75% of the average circumferential length. The block elements each have a surface area which when taken from a footprint of the tire occupies at least 60% of an area defined by a rectangular boundary having two axial and two circumferential extending sides. The axially extending sides 80 are parallel to the axis of rotation and the circumferentially extending sides 82 are perpendicular to the axis of rotation. The boundary has each side intersecting axial or circumferential extremities of the block element 50 thereby enveloping the element.

In the preferred embodiment as illustrated, the elements occupy at least 65% of the area defined by the rectangular boundary.

The tread block elements as illustrated have a circumferential extent as measured between the first and second sides which is in the range of 75% to 125% of the axial extent of the block element.

The tread pattern of the present invention should have a net-to-gross ratio of at least 55%. The illustrated embodiment has a net-to-gross ratio of above 65%. This higher percentage of rubber contacting the road is believed to contribute to improve overall tread wear.

In the illustrated embodiment, the central circumferential zigzag groove 35 has a width of greater than 5% of the tread width TW. The central groove 35 preferably has a width of 7% of the tread width while the second and third circumferential grooves 36,37 have a width of less than 90% of the width of the central groove, preferably less than 85%. This facilitates designing the tread with a zigzag amplitude greater at the central groove than at the shoulder grooves 36,37. It is believed that the irregular wear problems are more prone to occur near the shoulders than in the central region of the tread and therefore, the higher zigzag amplitude can be tolerated in that central region. It is recommended that the zigzag amplitude be at least 10% greater in the central groove 35 than in the second and third circumferential grooves 36 and 37. The zigzag amplitude as used herein refers to the lateral extending displacement of the centerline of the circumferentially extending grooves. The ribs 30,32 have a minimum cross section width of not less than 10.0% of the tread width TW as measured in any radial plane. The 10.0% minimum width is measured in any direction along the rib surface. In the event an optional narrow decoupling groove 38 is added to the rib 30,32, it should be ignored for purposes of measuring the minimum rib width.

The lateral grooves 40 have an average depth equal to the depth of the circumferential grooves 35,36,37 at the intersections of these grooves.

Figure 4:
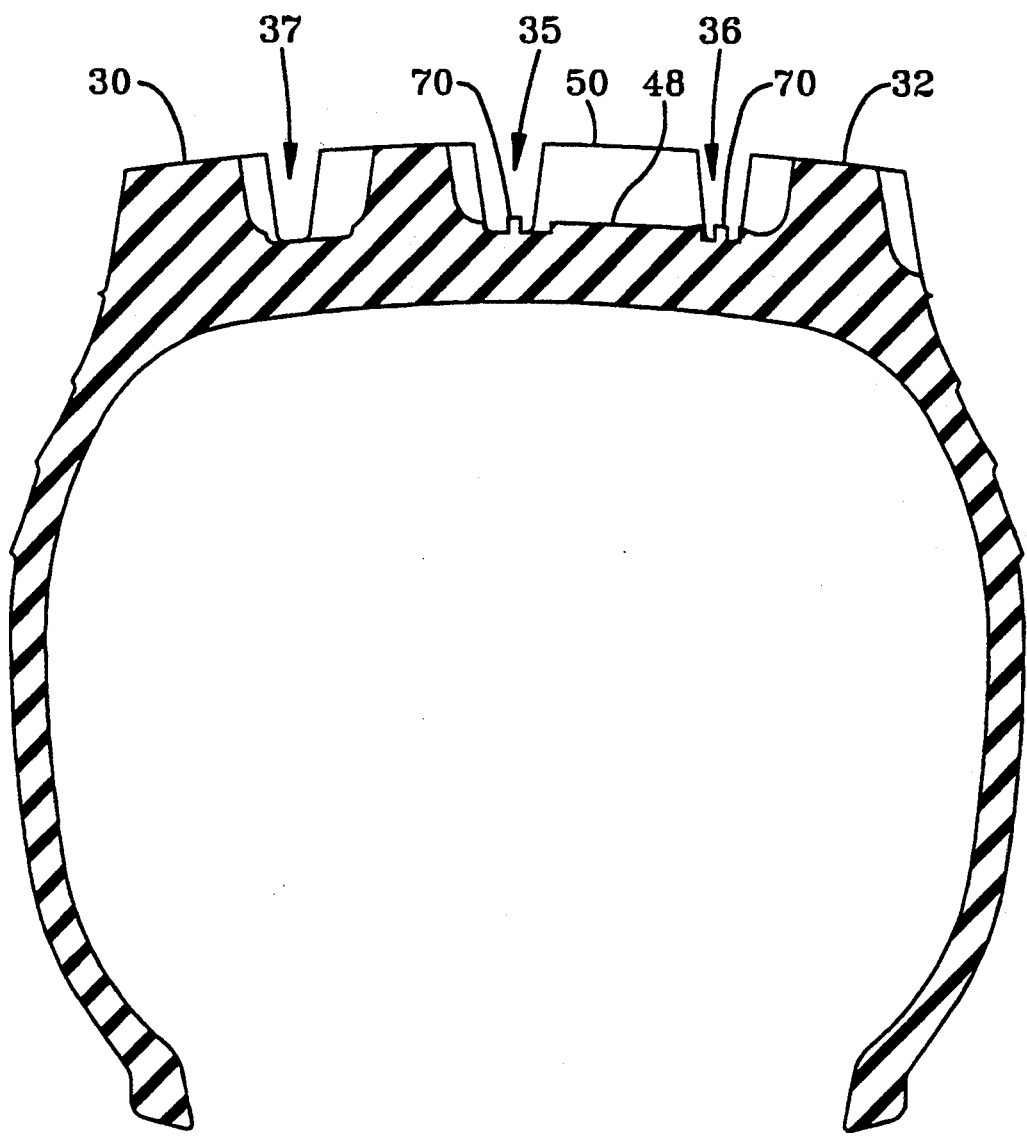
FIG. 4 is a cross-sectional view of the tire taken along lines 4—4 of FIG. 3.

In the preferred embodiment of the present invention, illustrated at FIGS. 3–5, a plurality of projections 70 are located in the bottoms of the lateral and circumferential grooves 40,35,36,37. These projections 70 help reduce the occurrence of trapping stones between the deep groove walls and also assist in preventing the stone from drilling through the inner tread surface 20 and exposing the reinforcing cords of the tire to damage.

Figure 2:
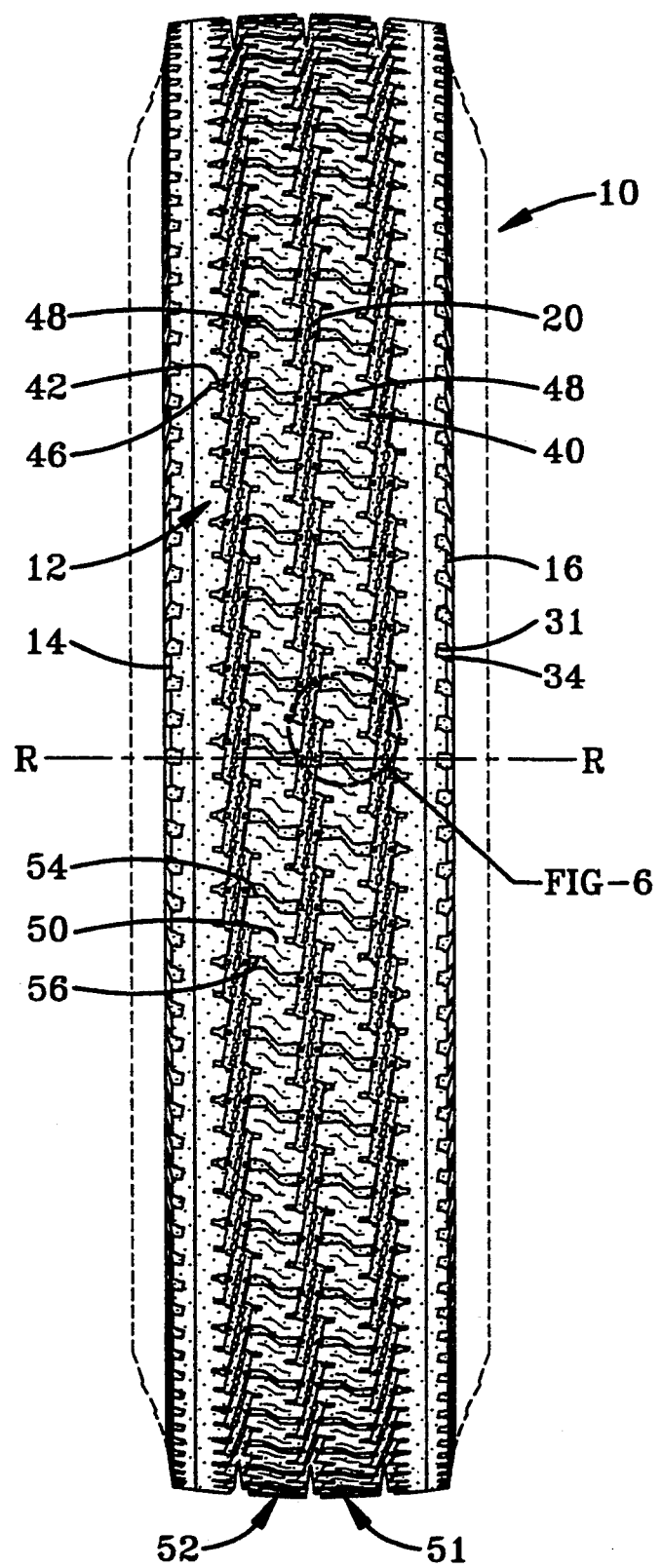
FIG. 2 is a plan view of the tread illustrated in FIG. 1.

As shown in FIGS. 2 and 3, a limited amount of siping 90 may be employed in the tread ribs 30,32 and block elements 50. The sipes 90 provide additional edges to assist in traction performance and reduce or delay the initiation of erosion type wear on protruding elements. The siping 90 adjacent the circumferential grooves 35,36,37 follows a path parallel to these grooves. The sipes 90 that laterally extend within the block elements 50 follow a path generally parallel to the lateral grooves 40.

Tires employing a tread pattern according to the present invention were tested under normal drive axle loading conditions. The tires were tested for occurrence of uneven wear and for tread wear mileage performance. After 181,667 miles, the left front drive axle inside position tire exhibited some minor yet noticeable right shoulder wear. After 171,659 miles, the outside position tire was extremely uniform with no signs of irregular wear.

By comparison, a 275/80R22.5 Michelin XDHT tire was tested to 180,237 miles. Both right shoulders were noticeably irregularly worn on the left front drive axle outside position and the left front drive axle inside position.

Two Goodyear G167 tires were also tested. At 181,667 miles, the left rear drive axle inside and outside position tires exhibited noticeable right shoulder wear. The block elements in the shoulder region were irregularly worn.

The test indicated that the inside position of the tandem tire set-up was the most severe use condition. In that position, all three types of tires exhibited some level of wear in the right shoulder area after over 180,000 miles. The present invention exhibits the least noticeable wear. In the outside position, the tire according to the present invention exhibited virtually no irregular wear while both the Michelin tire and the G167 tire showed signs of noticeable irregular wear.

It is believed that use of block elements in the shoulder region as in the G167 tread pattern may result in irregular wear. Further, the Michelin XDHT, which employs shoulder ribs, has almost identical irregular wear results as the G167 tires. This result is believed to be due to the use of lateral extending grooves in the ribs. These grooves effectively make the rib very flexible and, therefore, similar to block elements in terms of propensity to incur irregular wear problems.

The absence of irregular wear in the present tire combined with the preferred deep nonskid tread means that the tire may be capable of in excess of 200,000 miles of tread wear life.

The tires of the prior art designs were limited in tread wear life due to the irregular wear problems that prematurely shortened the useful life of the tread.

From the above test data, it is clear that a tread made according to the present invention can improve the overall treadwear performance compared to commercially available treads for drive axle use on commercial trucks.

It is believed that the tread rubber compound may be altered to permit extended mileage without employing the preferred 22 mm nonskid depth. Conventional truck tire rubber compounds employing a tread pattern according to the present invention should preferably employ the deeper nonskid to achieve maximum mileage. The design as described above, however, could permit alternative rubber compounds to be employed that have particularly excellent wear characteristics without a significant concern for uneven wear or traction problems due to the unique combination of the ribs and the block element's shape and orientation.

What is claimed:

1. An elastomeric tread for a pneumatic truck tire, the tread extending circumferentially about an axis of rotation of the tire, the tread comprising:
   an inner tread surface;
   a pair of shoulders which define the lateral edges of a ground engageable surface, the axial distance between the lateral edges defining the tread width;
   a pair of ribs, extending circumferentially about the axis of rotation and radially outwardly from the inner tread surface, one rib being adjacent to each lateral edge, wherein each of the ribs include a circumferentially continuous band devoid of lateral sipes or grooves, the circumferentially continuous band having an axial width of at least 10% of the tread width;
   a plurality of lateral grooves, each lateral groove extending generally axially from rib to rib;
   three circumferentially extending zigzag grooves, one circumferential groove being centrally located and the second and third circumferential grooves being axially spaced within 30% of the tread width from a lateral edge, the circumferential and lateral grooves cooperating to define block elements arranged in two circumferential rows, each block element having first and second sides defined by the lateral grooves the block elements having a circumferential extent as measured between the first and second sides which is in the range of 75% to 125% of the axial extent of each block element, the circumferential grooves having an average depth of at least 18 mm and the lateral grooves, between the first and second sides of circumferentially adjacent block elements, having an average depth of between 75% and 90% of the average depth of the circumferential grooves; and
   wherein the block elements each have a surface area which when measured from a footprint of the tire occupies at least 65% of an area defined by a rectangular boundary having two axial and two circumferentially extending sides, each such side intersecting axial and circumferential extremities of the block element, thereby enveloping the block element.

2. The tread of claim 1 wherein the lateral grooves each extend into the two shoulder ribs forming a notch in the ribs, the notch having an axially outer end and a base which is inclined and extends radially above the inner tread surface by at least 10% of the circumferential groove depth.

3. The tread of claim 2 wherein the shoulder ribs include a plurality of axially extending notches extending from the lateral edge to axially inner ends.

4. The tread of claim 1 wherein the three circumferentially extending grooves include at least one wide groove having a width of greater than 5% of the tread width and wherein the ribs have a minimum cross sectional width of not less than 10.0% of the tread width as measured in any radial plane.

5. The tire tread of claim 1 wherein the lateral grooves have an average depth equal to the depth of the circumferential grooves at intersections of the grooves.

6. The tread of claim 1 further comprises a plurality of projections within the circumferential and lateral grooves.

7. The tread of claim 1 wherein the tread has a net-to-gross ratio of at least 55%.

8. The tread of claim 1 wherein the circumferential grooves have an average depth of at least 22 mm.

9. The tread of claim 1 wherein the zigzag amplitude of the centrally located circumferential groove is at least 10% greater than the zigzag amplitude of the second and third circumferential grooves.

* * * * *